July 1, 1930.  N. E. GOODRICH  1,769,567

MASSAGING MACHINE

Filed May 3, 1928

INVENTOR
Norris E. Goodrich

BY
Chappell & Earl
ATTORNEYS

Patented July 1, 1930

1,769,567

UNITED STATES PATENT OFFICE

NORRIS E. GOODRICH, OF BATTLE CREEK, MICHIGAN, ASSIGNOR TO SANITARIUM EQUIPMENT COMPANY, OF BATTLE CREEK, MICHIGAN

MASSAGING MACHINE

Application filed May 3, 1928. Serial No. 274,721.

The main objects of this invention are:

First, to provide an improved massaging machine of the type employing crank disks with means for connecting the applicator directly thereto which prevent entangling of the applicator and eliminate wear therefrom.

Second, to provide a structure having these advantages in which the stroke may be readily adjusted or varied.

Third, to provide an improved applicator which is compact and at the same time has substantial power.

Objects pertaining to details and economies of my invention will appear from the description to follow. The invention is defined in the claims.

A structure embodying the features of my invention is clearly illustrated in the accompanying drawing, in which.

Figure 1:
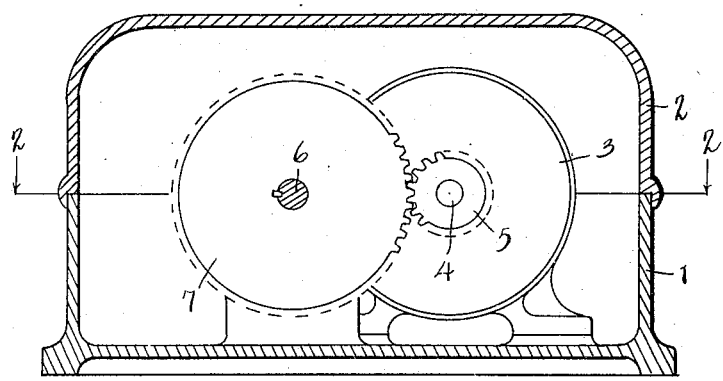
Fig. 1 is a vertical section on a line corresponding to line 1—1 of Fig. 2.
Figure 2:
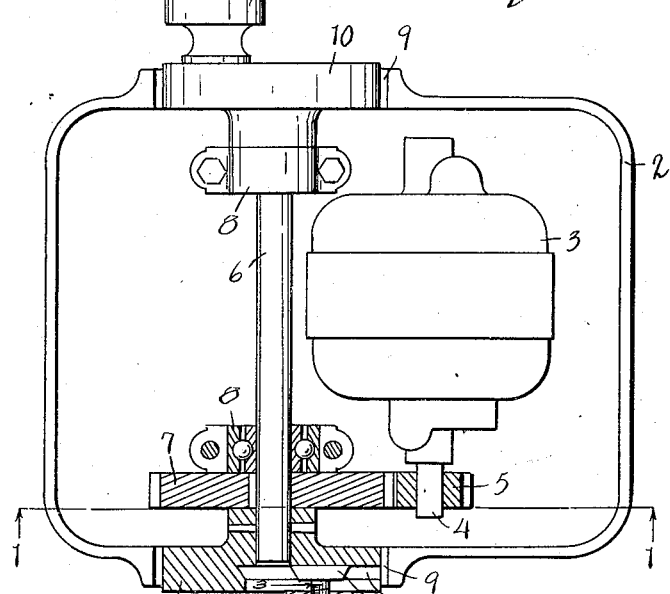
Fig. 2 is a view with the cover removed and partially sectioned on line 2—2 of Figs. 1 and 3.
Figure 3:
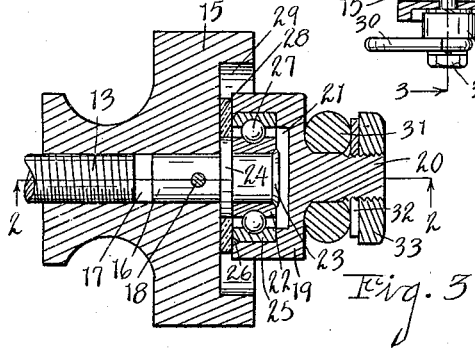
Fig. 3 is an enlarged detail of the crank and applicator coupling means.

Referring to the drawing, the body portion 1 of the housing is preferably a box-like casting and is adapted to receive a cover 2. Within the housing I mount the motor 3. The motor shaft 4 is provided with a pinion 5. Disposed parallel with the motor shaft is a driven shaft 6 having a gear 7 thereon meshing with the pinion 5. The shaft is supported by bearings 8 mounted within the housing in spaced relation to the ends of the shaft. The shaft is alined with openings 9 in the side walls of the housing which are of such dimensions as to receive the crank disks 10.

The crank disks 10 are provided with radial undercut or dove-tailed grooves 11 in which the heads 12 of the crank pin studs 13 are engaged. The body members 14 of the crank pins are threaded upon the studs to clamp the sides of the disk, thereby clamping the crank pins in their adjusted positions. These body members have handhold portions 15 which may be grasped for loosening and clamping the crank pins in place.

Bearing studs 16 project from the outer ends of the body members and are disposed in the central bores 17 of the head members and secured therein by the pins or keys 18.

Coupling members 19 are provided having central outwardly projecting studs 20 and inwardly opening recesses 21 adapted to receive the bearings by which the coupling members are rotatably supported and are connected to the bearing studs. The inner ball race or bearing member 22 is secured to the stud 16 by upsetting at 23, thereby clamping the bearing member against the shoulder 24. The outer bearing member 25 is secured to the coupling member by upsetting the same at 26. The bearing balls 27 are provided to coact with these bearing members. A thrust bearing member 28 is disposed between the coupling member and the end of the handhold portions 15. A recess 29 in the portion 15 encloses the inner end of the coupling member.

The applicator attaching hooks 30 are provided with eyes 31 engaging the studs for rotative movement therein. These eyes, however, are engaged by the spring washer 32, the tension of which is adjusted by means of nuts 33. The applicator engaging hooks are thus normally held in a fixed relation on the coupling members, but in the event of undue stress thereon will move or rotate.

I have illustrated and described my improvements in an embodiment which I regard as very satisfactory. I have not attempted to illustrate and describe other embodiments or adaptations of my improvements which I contemplate as I believe the disclosure made will enable those skilled in the art to embody or adapt the same as may be desired.

Having thus described my invention what I claim as new and desire to secure by Letters Patent is:

1. In a massaging machine, the combination of a shaft, crank disks provided with radially disposed dove-tailed ways, crank pins comprising threaded studs provided with heads slidable in said ways, body members threaded upon said studs for clamping them in their adjusted positions, said body member being provided with bearing studs, ball bearings comprising inner bearing members secured to said bearing studs and outer bearing members secured to said coupling member and coacting balls, and applicator engaging members on said coupling member studs.

2. In a massaging machine, the combination of a shaft, crank disks mounted on said shaft provided with radially disposed dovetailed ways, crank pins comprising studs provided with heads slidable in said ways, body members threaded upon said studs for clamping them in their adjusted positions, bearing studs keyed to said body members, and coupling members having ball bearing connections with said bearing studs.

3. In a massaging machine, the combination of a driven shaft, crank disks mounted on said shaft and provided with radially adjustable crank pins, coupling members having ball bearing connection with said crank pins, said coupling members having studs thereon, hooks having eyes engaging said studs, nuts threaded upon said coupling member studs, and spring washers disposed on said studs to coact with the eyes of said hooks.

4. In a massaging machine, the combination of a crank disk provided with a crank pin, a rotatable coupling member carried by said crank pin and provided with a coupling stud, an applicator attaching member rotatably engaging said stud, and a friction means coacting with said attaching member for normally preventing its rotation on said coupling member while permitting such rotation under excessive stresses.

5. In a massaging machine, the combination of a crank disk provided with a radially disposed dove-tailed way, a crank pin comprising a threaded stud provided with a head slidable in said way, a body member threaded upon said stud for clamping it in its adjusted position, said body member being recessed at its outer end, a bearing stud keyed to said body member, a coupling member having a bearing recess at its inner end and a centrally disposed projecting stud, a ball bearing comprising an inner bearing member secured to said bearing stud and an outer bearing member secured within said coupling member recess and coacting balls, a hook provided with an eye rotatably engaging said coupling member stud, a nut threaded upon said coupling member stud, and a spring washer disposed on said coupling member stud to coact with the eye of said hook.

6. In a massaging machine, the combination of a crank disk provided with a radially disposed dovetailed way, a crank pin comprising a threaded stud provided with a head slidable in said way, a body member threaded upon said stud for clamping it in its adjusted position, said body member being recessed at its outer end, a bearing stud keyed to said body member, a coupling member having a bearing recess at its inner end and a centrally disposed projecting stud, and a ball bearing comprising an inner bearing member secured to said bearing stud and an outer bearing member secured within said coupling member recess and coacting balls.

7. In a massaging machine, the combination of a crank disk provided with a crank pin, a bearing stud carried by said crank pin, a coupling member having a projecting stud, a ball bearing comprising an inner bearing member secured to said bearing stud and an outer bearing member within said coupling member and coacting balls, a hook provided with an eye rotatably engaging said coupling member stud, a nut threaded upon said coupling member stud, and a spring washer disposed on said coupling member stud to coact with the eye of said hook.

8. In a massaging machine, the combination of a crank disk provided with a crank pin, a bearing stud carried by said crank pin, a coupling member having a projecting stud, and a ball bearing comprising an inner bearing member carried by said bearing stud and an outer bearing member within said coupling member and coacting balls.

9. In a massaging machine, the combination with a housing having opposed openings in the side walls thereof, a motor mounted within said housing, a driven shaft, bearings for said driven shaft disposed within said housing and supporting it centrally relative to said wall openings, driving connections for said motor to said driven shaft within said housing, crank disks mounted on the ends of said driven shaft at the outer sides of said bearings and rotatable within said openings in said housing walls, the edges of the openings being outwardly flanged to constitute guards for said crank disks, crank pins on said crank disks, and applicator hooks rotatably mounted on said crank pins.

In witness whereof I have hereunto set my hand.

NORRIS E. GOODRICH.